United States Patent [19]
DeVilbiss

[11] Patent Number: 5,125,009
[45] Date of Patent: Jun. 23, 1992

[54] METHOD AND APPARATUS FOR SYNCHRONOUSLY DISTRIBUTION DIGITAL SIGNALS IN HIGH SPEED SYSTEMS

[75] Inventor: Alan J. DeVilbiss, Colorado Springs, Colo.

[73] Assignee: Hewlett-Packard Co., Palo Alto, Calif.

[21] Appl. No.: 553,488

[22] Filed: Jul. 13, 1990

[51] Int. Cl.⁵ .................... H04L 7/00; H04B 1/00
[52] U.S. Cl. .................... 375/107; 328/25; 328/38.1; 455/51.1; 455/57.1
[58] Field of Search .......... 375/106, 107, 109, 36; 371/1; 455/51, 57, 71, 50; 368/46, 52, 55; 331/55, 76; 328/16, 25, 38.1

[56] References Cited

U.S. PATENT DOCUMENTS

| | | | |
|---|---|---|---|
| 1,904,544 | 4/1933 | Schmied | 455/51 |
| 3,786,419 | 1/1974 | Nick | 375/107 |
| 4,119,912 | 10/1978 | Nagy et al. | 375/107 |
| 4,451,930 | 5/1984 | Chapman et al. | 455/51 |
| 4,596,025 | 6/1986 | Satoh | 375/107 |
| 4,878,231 | 10/1989 | Cok | 375/80 |

Primary Examiner—Benedict V. Safourek
Assistant Examiner—Young Tse

[57] ABSTRACT

Method and apparatus for ensuring synchronism among modules of a distributed digital system (DDS) to a master clock signal is disclosed. The master clock signal is distributed at a frequency $f_c/N$, and circuitry associated with each module multiplies the distributed master clock signal by N to provide a desired sync frequency $f_c$ to each module.

15 Claims, 5 Drawing Sheets

FIG. 3 PRIOR ART
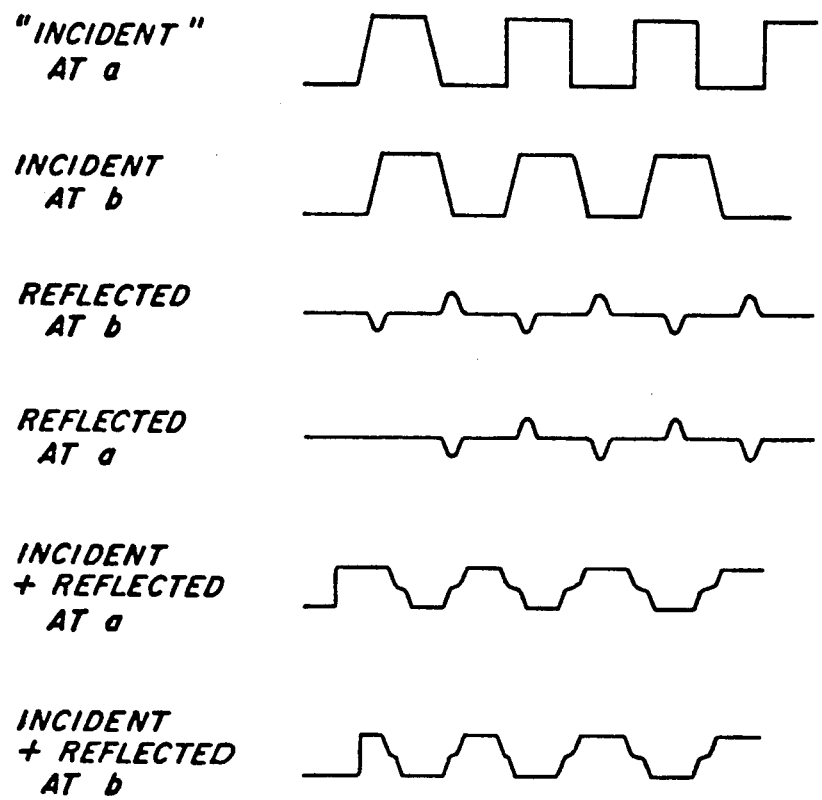
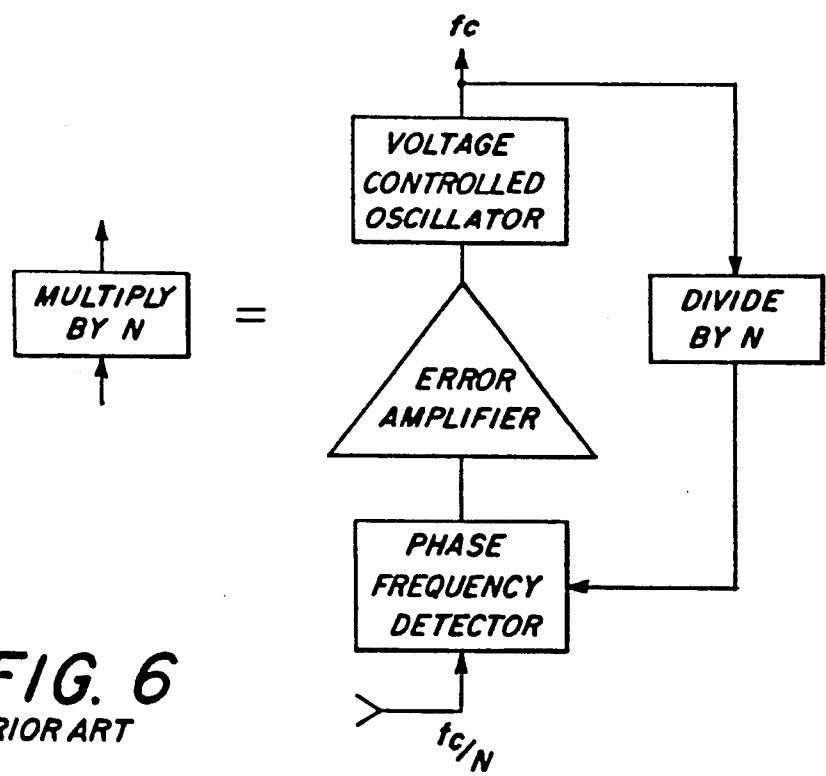
FIG. 6 PRIOR ART

FIG. 4A
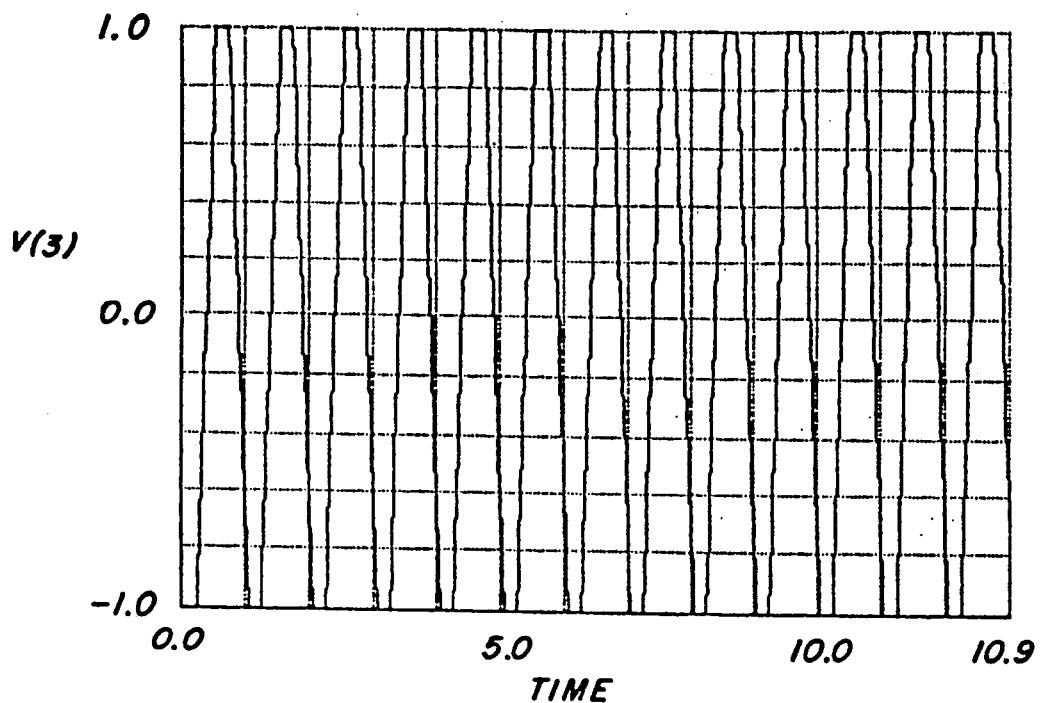
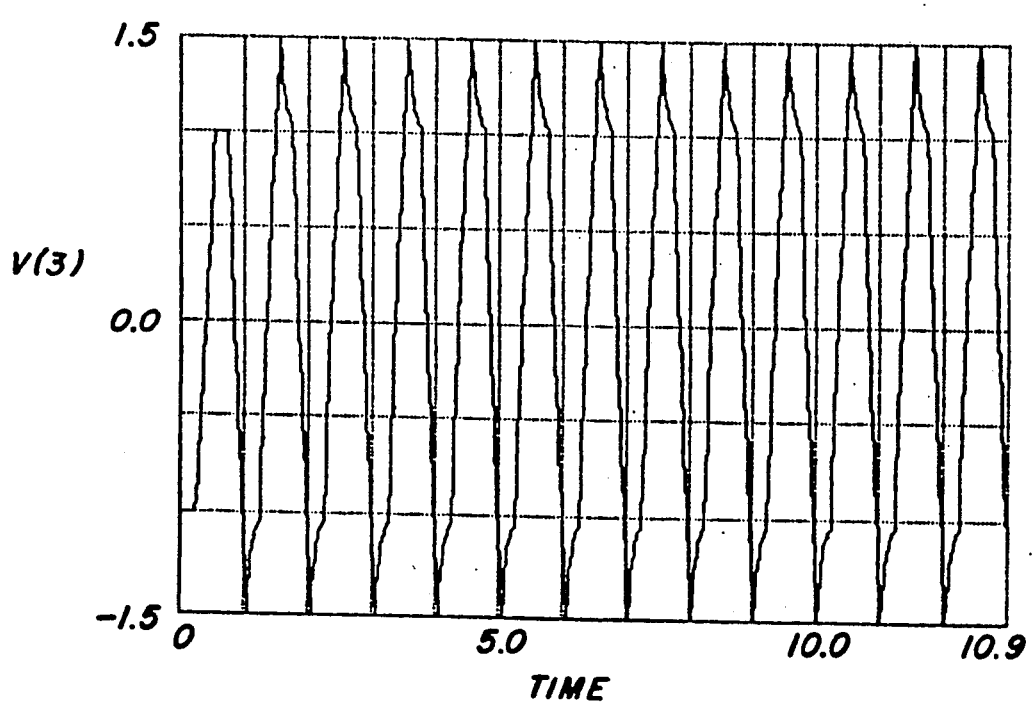
FIG. 4B

FIG. 5A
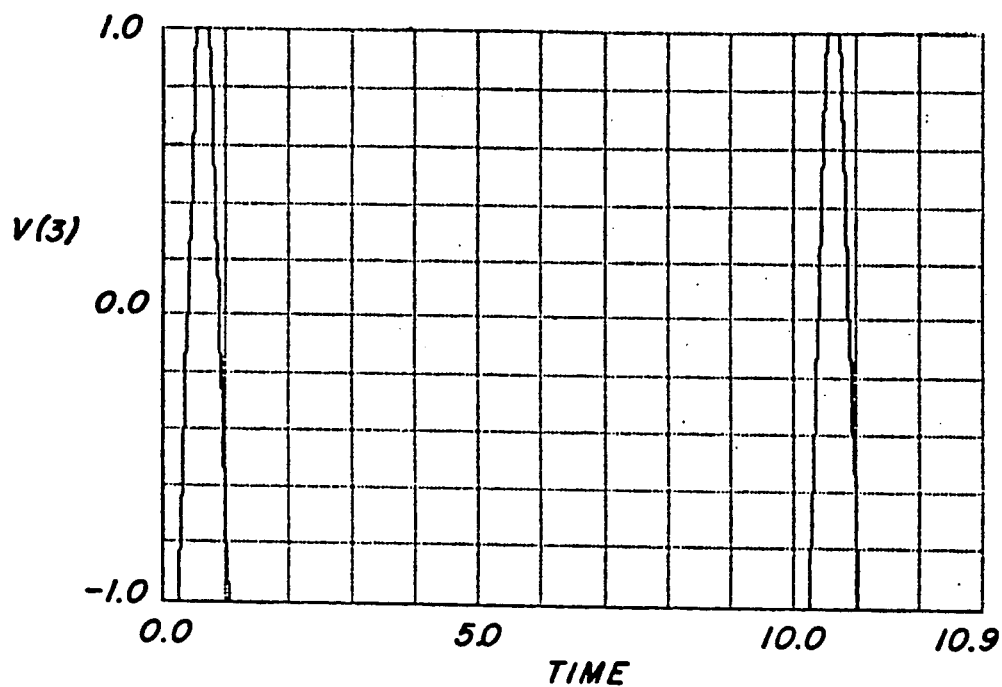
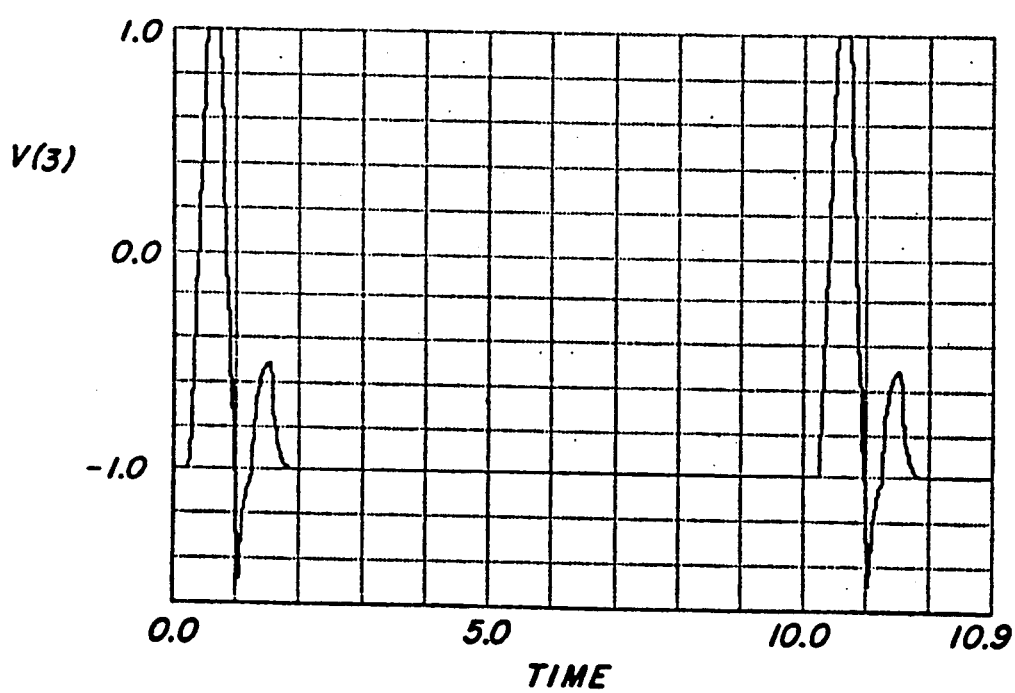
FIG. 5B

FIG. 5C
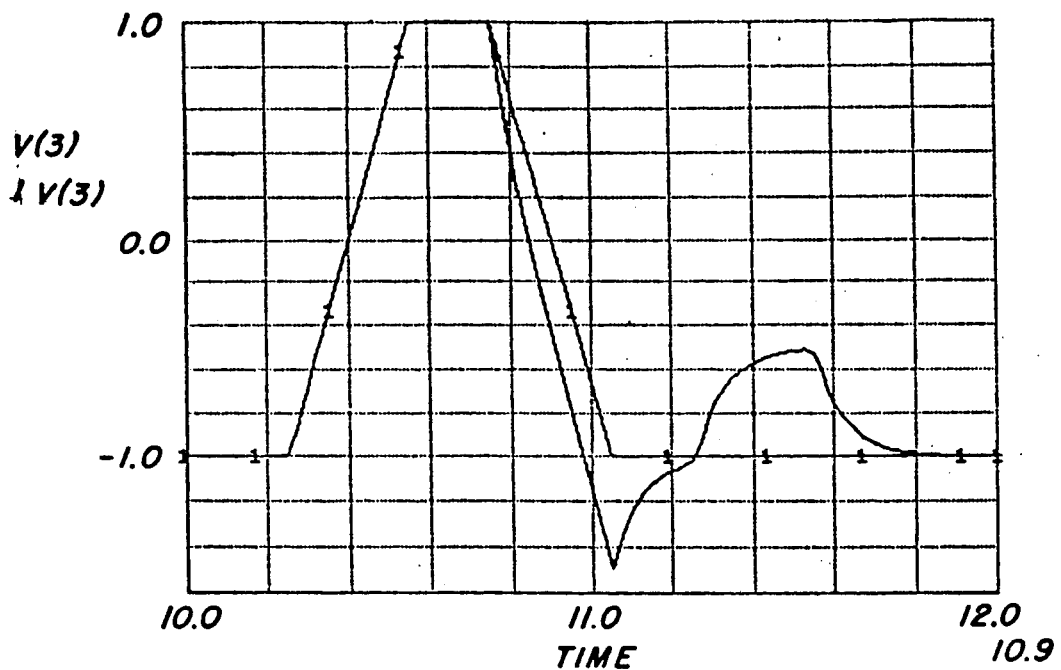
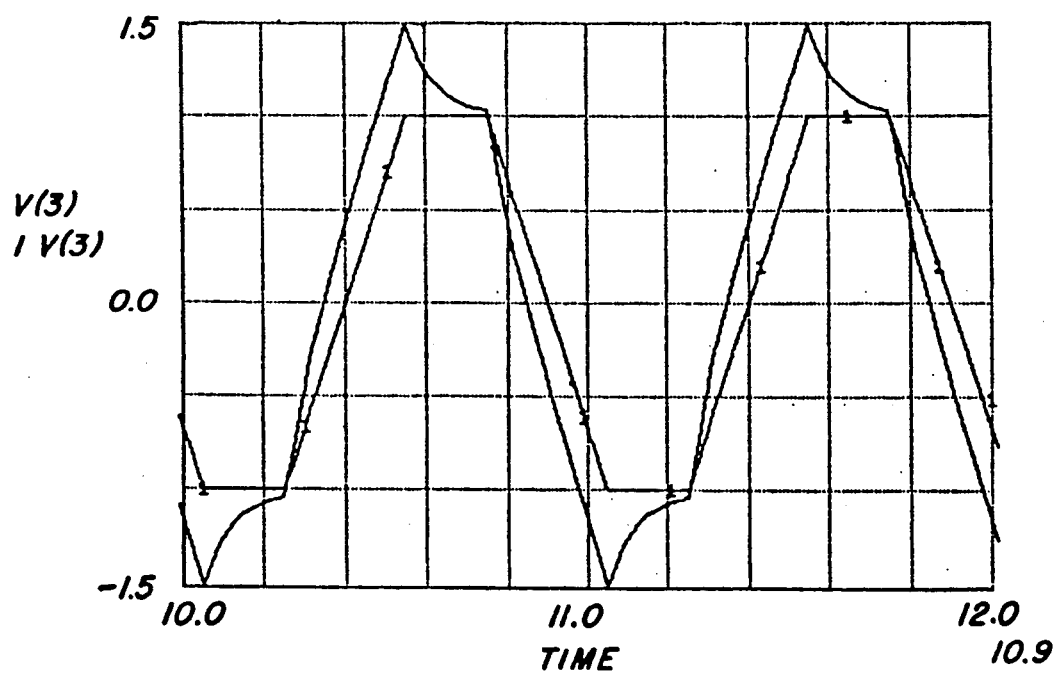
FIG. 4C

METHOD AND APPARATUS FOR SYNCHRONOUSLY DISTRIBUTION DIGITAL SIGNALS IN HIGH SPEED SYSTEMS

FIELD OF THE INVENTION

The present invention relates generally to the field of distributed digital systems (DDS's). More particularly, the present invention relates to a method and apparatus for distributing clock and/or enable signals and the like to the digital modules of a high speed DDS in a manner that ensures module synchrony.

BACKGROUND OF THE INVENTION

Distributed digital systems, or DDS's, are generally known. DDS's are employed in digital systems such as digital oscilloscopes, logic analyzers, and digital telecommunications systems to name but a few. A DDS usually comprises a network of digital modules interconnected by signal transmission lines such as cabling, printed circuit traces, etc. The modules are generally devices such as microcomputers, voltmeters, D/A and/or A/D converters, multichannel data acquisition units, digital word generators, processing circuitry etc., as well as submodules within such devices.

It is frequently imperative that the modules of the DDS be synchronized so that they are triggered simultaneously by some event originating either on one of the modules or externally of one or more of the modules, e.g., by pulses from a master clock. For simplicity, the example of a master clock will be employed in connection with the following description, but it is to be understood that this is for explanatory purposes only and that the invention described herein is not limited thereto. The invention has application to any DDS where the modules are intended to be simultaneously responsive to an external event, including, by way of example, enable and/or inhibit signals, sample signals, set and/or reset signals and the like, and the example of the master clock is applicable to thereto. Thus, as used herein, reference to master clock pulses is intended to encompass such signals.

Typically, master clock pulses are generated somewhere in (or even externally of) the DDS and transmitted over a transmission line to the various modules. In state of the art DDS's, master clock pulses in the gigahertz range are common. This has given rise to problems not present, or less significant, in DDS's operating at lower frequencies. For example, transmission of such high frequency master clock pulses requires specially designed high frequency transmission lines that add to the complexity and expense of the DDS. Additionally, the terminal impedance of the transmission line is not precisely controllable and often causes an impedance mismatch at high frequencies. Moreover, discontinuities may appear on the transmission line at high frequencies. Impedance mismatches and discontinuities can cause reflections of incident master clock pulses to appear on the transmission line. As the master clock frequency increases, and as the module spacing increases, the reflections may increasingly interfere with and/or distort the incident master clock pulses. Since the magnitude of a reflected signal at any point along a transmission line is a function of the location and severity of the impedance mismatch/discontinuity which caused it, the resultant clock pulses received by a particular module may be changed enough to cause that module to be less accurately synchronized with the other modules of the DDS.

It is therefore desirable to provide a method and apparatus in which the modules of a DDS remain synchronized at high frequency operation even in the presence of impedance mismatches and/or discontinuities on the transmission line carrying the master clock pulses (or signals indicative of some event) to which the modules are to be synchronized. It is also desirable that such method and apparatus be simple in design and easy and economical to implement. The present invention achieves these goals.

SUMMARY OF THE INVENTION

In a DDS having a plurality of digital modules each being responsive to a desired frequency f of events, such as master clock pulses and the like, and a transmission line for carrying the events to the modules, an apparatus comprises means for providing the occurrence of the events at a frequency $f_c/N$ which is less than the desired frequency, and means associated with each module for multiplying events received on the transmission line by N and thereby providing the events to the modules at the desired frequency. The distribution of the events at the frequency $f_c/N$ on the transmission line, rather than at the higher frequency $f_c$, effectively minimizes reflection of incident events due to impedance mismatches and discontinuities on the transmission line so that synchrony of the modules to the events is less effected by reflections even when the desired frequency is very high, e.g., in the gigahertz range.

According to the invention, the frequency $f_c/N$ is selected so that any part of the event reflected from the termination impedance $Z_L$ of the transmission line (or any other discontinuity on the line) will not substantially distort leading edges of incident events, i.e., leading edges of clock pulses.

A method according to the invention comprises the steps of first defining a desired frequency of events $f_c$ to which the various modules of the DDS are to be responsive, then distributing events on the transmission line at a frequency $f_c/N$, receiving the distributed events at the modules, and multiplying the received events by N at each module. The frequency of events thus provided to each module is the desired frequency, even though the events are distributed on the transmission line at a much lower frequency.

BRIEF DESCRIPTION OF THE DRAWINGS

FIG. 3 illustrates waveforms of incident and reflected pulses that may be experienced in prior art DDS's.

FIGS. 4A–4C are graphs illustrating performance characteristics of the transmission line of FIG. 2 for master clock pulses distributed thereover at a frequency of 1.0 GHz.

FIGS. 5A–5C are graphs illustrating performance characteristics of the transmission line of FIG. 2 for master clock pulses distributed thereover in accordance with the principles of the present invention.

FIG. 6 is a block diagram of apparatus for implementing the "x N" blocks of FIG. 1.

DETAILED DESCRIPTION OF THE PREFERRED EMBODIMENT

Figure 1:
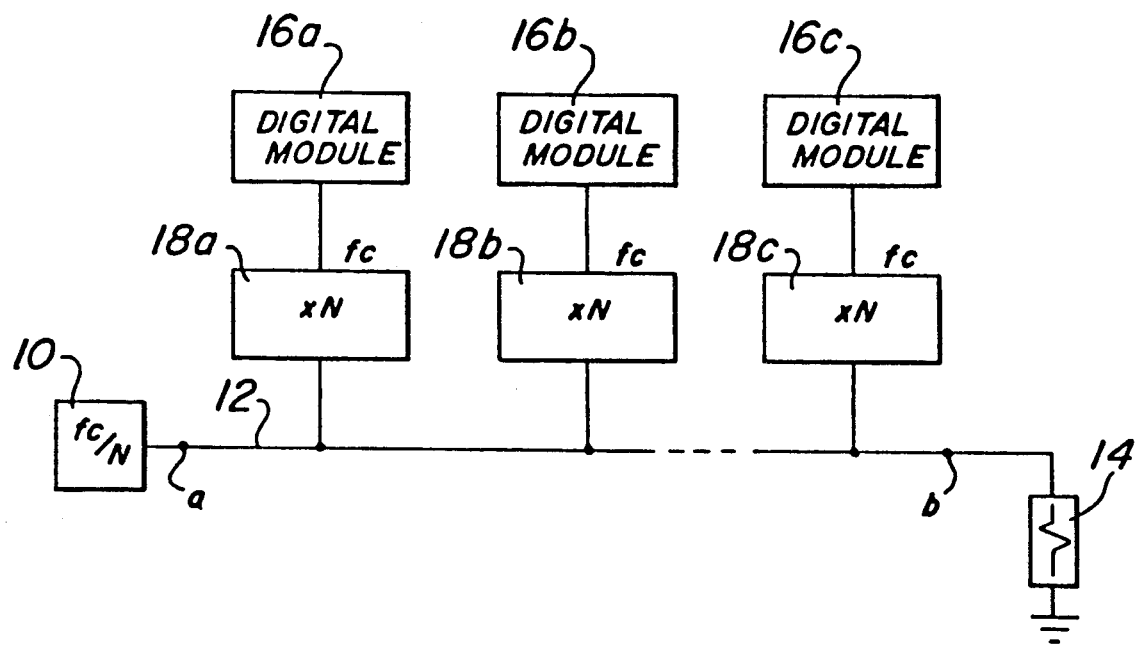
FIG. 1 is a simplified block diagram of a DDS employing apparatus for synchronously distributing master clock pulses to a plurality of modules over a transmission line in accordance with the present invention.

Referring now to the drawings, wherein like numerals represent like elements, there is illustrated in FIG. 1 an apparatus according to the present invention for synchronously distributing master clock pulses to the various modules of a DDS. In the DDS of FIG. 1 (as in the prior art), the master clock pulses originate from a master clock 10 and are distributed to modules 16a, 16b, 16c, etc., but it should be understood that the invention is applicable to DDS's irrespective of where the pulses originate.

Figure 2:
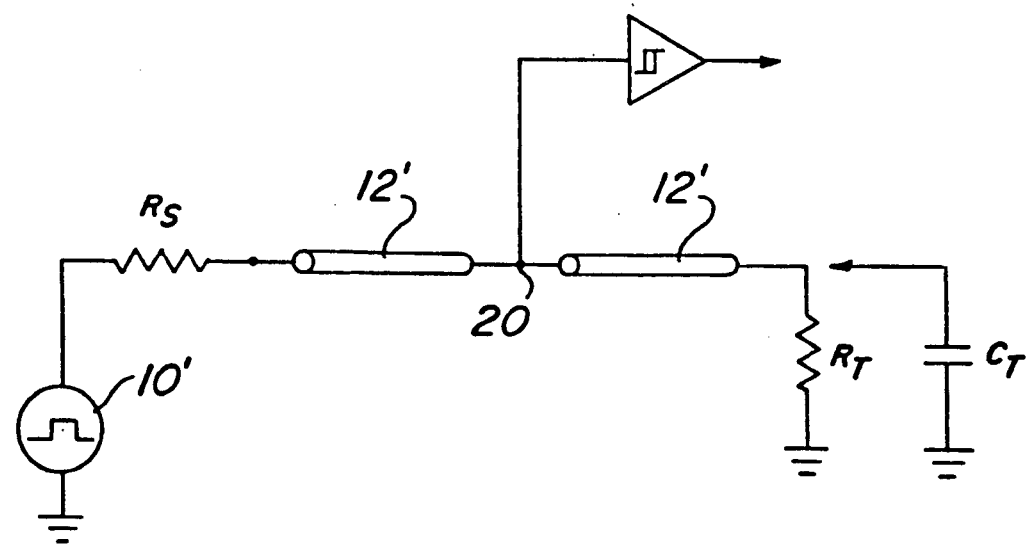
FIG. 2 illustrates an exemplary conventional transmission line for distributing the master clock pulses to the plurality of modules of FIG. 1 and is provided for the purpose of demonstrating the underlying principles of the present invention.

As shown in FIG. 2, the transmission line 12 that distributes the master clock pulses from master clock 10 is terminated with a load 14. In conventional state of the art DDS's, it is common for each module 16 to be some sort of high speed module that is responsive to externally generated high frequency clock pulses, i.e., in the gigahertz range. In the prior art, the master clock pulses are generally distributed to the modules 16 on the transmission line 12 at the frequency which each of the modules 16 is to be responsive. As described below, a problem arises in distributing the master clock pulses at high (gigahertz) frequencies that may severly affect system performance and result in imprecise synchrony among the various modules.

It is difficult, if not impossible, to precisely balance the transmission line 12 with a terminal impedance 14, and even for a transmission line that is balanced for a particular frequency, impedance mismatches will occur as clock frequency varies. Moreover, impedance mismatches occur as a result of other discontinuities in the transmission line 12. For example, assuming a transmission line 12 with a characteristic impedance, $Z_o$, of 50 ohms, the termination 14 will be a parallel combination of a 50 ohm resistance and a capacitance of about 3 pF. It will be apparent to those skilled in the art that the value of the terminating impedance 14 will be a function of the pulse repetition frequency of master clock 10. Therefore, typically a master clock signal injected onto transmission line 12 by master clock 10 will result in an incident master clock signal at termination 14, and a reflected signal from termination 14. (This, of course, will also be true at any other discontinuity on transmission line 12.) The magnitude of these reflections will generally increase as frequency increases. Overlapping reflected and incident pulses may tend to reinforce or cancel each other, with resultant pulses having varying magnitude and shape, depending on the location, presence or absence of discontinuity. The waveforms of FIG. 3 illustrate this problem. The varying magnitude and shape may result in false triggering of one or more modules 16, or more likely, may result in failure of one or more modules 16 to respond at the correct time to the occurrence of a pulse. Thus, synchrony may be lost.

As explained in more detail below, minimizing the effects of reflections from impedance mismatches and discontinuities on the transmission line 12 is the principle underlying the present invention.

According to the invention, the frequency of the master clock pulses originating from the master clock 10 and distributed over the transmission line 12 to the modules 16 is substantially lower than the clock frequency normally required, or expected, by each of the modules 16, i.e., substantially lower than the frequency to which each module 16 is to be responsive (hereinafter "the desired clock frequency"). That is, master clock 10 distributes master clock pulses having a frequency of $f_c/N$, where $f_c$ is the desired clock frequency. Preferably, the frequency of the distributed master clock pulses is lower than the desired clock frequency by a factor N, where N is an integer ranging from about 10 to 50, although other values of N are not precluded. For applications where the desired clock frequency is the gigahertz range however, N=10 has been found to represent a practical lower limit. As will be appreciated by those skilled in the art, distributing a lower master clock frequency will reduce the effects of impedance mismatches and discontinuities, and thus minimize reflections on the transmission line 12.

In accordance with the invention, each of the modules 16 has associated therewith a "x N" frequency multiplier 18 for receiving the distributed master clock pulses (having frequency $f_c/N$) and providing the desired clock frequency ($f_c$) to the associated module. Of course, the "x N" frequency multipliers 18 may be provided internally and/or integrally, of each module 16 if desired. Externally provided "x N" frequency multipliers 18 are particularly suitable for retrofit applications.

Preferably, each of the frequency multipliers 18 are conventional phase-locked loop circuits configured for frequency multiplication in well known fashion. FIG. 6 illustrates a typical phase locked loop configured for frequency multiplication. Any commercially available phase locked loop, e.g., an off the shelf integrated circuit, may be employed to implement the "x N" frequency multipliers 18 of FIGS. 1 and 6.

It will be appreciated from the foregoing that the frequency of the distributed master clock pulses $f_c/N$ will be increased by N by frequency multipliers 18 wherever the desired clock frequency $f_c$ is required. The desired clock frequency is provided to the respective digital modules 16 so that each module 16 operates synchronously with all other modules 16 as a result of the frequency multipliers 18 locking onto a predefined edge of the distributed low frequency ($f_c$) master clock signal.

It will be understood that the short term frequency and phase accuracy of each frequency multiplier 18 must allow the requirements for system time accuracy to be met. The frequency $f_c/N$ of the distributed master clock pulses must be high enough to provide frequent synchronization opportunities to the various modules 16 and low enough to allow reflections resulting from impedance mismatches and discontinuities on the transmission line 12 to dissipate during the interval between sequential clock pulses. The optimum value of $f_c/N$ will depend upon the timing requirements of the system. The result of practicing this invention is that any distortion of the distributed master clock pulses caused by interference from reflected signals will be minimized, thereby ensuring that frequency multipliers 18 will be triggered only at the correct times. In one example of an implementation of the invention, the frequency $f_c/N$ of the distributed master clock pulses is approximately 100 MHz and the desired clock frequency $f_o$ is 1 GHz, i.e., N=10.

Other advantages flow from practice of the invention. For example, since the master clock 10 operates at a frequency $f_c/N$ that is 10-50 times lower than normally required, its design and construction may be simpler and less expensive than would otherwise be required. Moreover, as a result of distributing lower frequency clock pulses on the transmission line 12, the design and construction of the transmission line may be simpler.

Full appreciation of the invention can be had by reference to the computer generated simulations of FIGS. 4 and 5. These simulations are for the exemplary transmission line 12 illustrated in FIG. 2. The exemplary circuit of FIG. 2 comprises a clock or pulse generator 10' having an internal resistance $R_s$, of 50 ohms; two sections of transmission line 12' each of which has a characteristic impedance $Z_o$ of 50 ohms and a length $T_d$ of 0.25 ns; and termination resistance $R_T$ of 50 ohms. In the simulations, the voltage at node 20 was calculated for four different cases, i.e., master clock pulses occurring at 1 nanosecond intervals (a 1.0 GHz clock rate) and 10 nanosecond intervals (a 100 MHz clock rate), each with and without a single 3 pF capacitance discontinuity $C_T$, in parallel with termination resistance $R_T$. Node 20 was chosen as an example of a point at which one part of a DDS might be clocked.

FIG. 4A is a graph of the computed voltage waveform for the 1 GHz distributed master clock with no discontinuity. FIG. 4B is the voltage waveform for the same 1 GHz clock with the 3 pF discontinuity $C_T$ in parallel with $R_T$. FIG. 4C shows the two waveforms of FIGS. 4A and 4B on an expanded time scale. FIGS. 5A-5C show the results of the same same simulations as FIGS. 4A-4C, respectively, but for a 100 MHz distributed master clock instead of a 1 GHz clock.

A comparison of FIGS. 4C and 5C illustrates that the clock time $t_o$ (rising edge zero-crossing) for the system with the 1 GHz clock (FIG. 4C) is changed by the presence of the discontinuity, while the clock time $t_c$ for the 100 MHz system (FIG. 5C) is not. Although the exemplary circuit chosen for illustration is rather simple, the advantages of distributing and synchronizing to a lower frequency master clock will similarly manifest themselves in more complex circuits.

It should be emphasized that distributing the lower frequency clock $f_c/N$ in place of the higher frequency clock $f_o$ is easier and more efficient, and allows the use of components having lower frequency response capabilities. Also, as previously mentioned, activity other than clocking may also be facilitated in accordance with the invention. For example, individual modules of the DDS could be simultaneously enabled. If an enable signal is distributed to each module and acted upon at the next (local) clock transition, then, for a 1 GHz clock, the enable signal must change state unambiguously within a 1 nanosecond interval. For a 100 MHz clock the available interval is 10 nanoseconds.

It will be appreciated that the present invention may be employed in a great number of applications, including, but certainly not limited to, use in digital oscilloscopes and logic analyzers (both state analysis machines employing an external clock and time analysis machines employing an internal clock), as well as telecommunications circuits.

The present invention may be embodied in many specific forms without departing from the spirit or essential attributes thereof. Accordingly, reference should be made to the appended claims, rather than to the foregoing specification, as indicating the scope of the invention.

What is claimed is:

1. In a distributed digital system having a plurality of digital modules each being responsive to a desired frequency $f_c$ of events, and a transmission line for carrying the events to the modules, an apparatus comprising:
   first means for providing the occurrence of the events at a frequency $f_c/N$ which is less than the desired frequency $f_c$, where N is a number greater than 1, the occurrence of events at frequency $f_c/N$ being provided directly on the
   second means associated with each module for multiplying the frequency of events received on the transmission line by N and providing the events to the modules at the desired frequency $f_c$;
   wherein $f_c/N$ is high enough to provide frequent synchronization opportunities to the modules and low enough to effectively minimize reflections of incident events due to impedance mismatches and discontinuities on the transmission line.

2. Apparatus according to claim 1 wherein the events are clock pulses.

3. Apparatus according to claim 2 wherein the first means is a master clock circuit.

4. Apparatus according to claim 1 wherein the desired frequency of events $f_c$ is greater than or equal to 1 gigahertz.

5. Apparatus according to claim 1 wherein N is an integer having a value of between 10 and 50.

6. Apparatus according to claim 1 wherein the desired frequency of events $f_c$ is greater than or equal to 1 gigahertz and N is an integer having a value of between 10 and 50.

7. Apparatus according to claim 1 wherein the second means is a phase locked loop configured for frequency multiplication.

8. A synchronized distributed digital system (DDS) comprising:
   (a) a plurality of digital modules each responsive to a desired frequency $f_c$ greater than or equal to 1gigahertz;
   (b) a master clock for providing clock pulses to the digital modules, the master clock pulses having a frequency of $f_c/N$, where N is an integer having a value of between 10 and 50;
   (c) a transmission line for distributing the master clock pulses to the digital modules; and,
   (d) an N times frequency multiplier associated with each digital module for receiving the distributed master clock pulses, multiplying the frequency of the received pulses by N and providing the desired frequency $f_c$ to each module;
   wherein $f_c/N$ is high enough to provide frequent synchronization opportunities to the modules and low enough to effectively minimize reflections of incident events due to impedance mismatches and discontinuities on the transmission line;
   whereby the synchrony of the modules to the events is less affected by the effect of the reflections.

9. A synchronized DDS according to claim 8 wherein the frequency multipliers are phase-locked loops.

10. Synchronization method comprising the steps of:
    (a) defining a desired frequency of events $f_c$ to which modules of a distributed digital system (DDS) are to be responsive;
    (b) distributing events directly on a transmission line of the DDS at a frequency $f_c/N$, where N is a number greater than 1;
    (c) receiving the distributed events at the modules, and multiplying the frequency of the received events of frequency $f_c/N$ by N at each module, the frequency of events provided to each module thereby being the desired frequency $f_c$;

wherein $f_c/N$ is high enough to provide frequent synchronization opportunities to the modules and low enough to effectively minimize reflections of incident events due to impedance mismatches and discontinuities on the transmission line;

whereby synchrony of the modules to the events is less affected by the effect of the reflections.

11. Method according to claim 10 wherein the events are clock pulses.

12. Method according to claim 10 wherein the desired frequency of events $f_c$ is greater than or equal to 1 gigahertz.

13. Method according to claim 10 wherein N is an integer having a value of between 10 and 50.

14. Method according to claim 10 wherein the desired frequency of events $f_c$ is greater than or equal to 1 gigahertz and N is an integer having a value of between 10 and 50.

15. Method of synchronizing a plurality of digital devices to a desired frequency $f_c$, the devices being linked together by a transmission line, each device being located at different points along the transmission line, comprising the steps of:

(a) providing master clock pulses having a frequency of $f_c/N$ pulses per second directly on the transmission line, $f_c/N$ being high enough to provide frequent synchronization opportunities to the digital devices and low enough to effectively minimize reflections of master clock pulses due to impedance mismatches and discontinuities on the transmission line;

(b) detecting the occurrence of master clock pulses of frequency $f_c/N$ at said points along the transmission line;

(c) multiplying the frequency of detected master clock pulses of frequency $f_c/N$ by N, where N is a number greater than 1, thereby providing at said points along the transmission line a clock signal having a frequency of $f_c$; and, (d) providing the clock signals produced in step (c) to the respective digital devices;

wherein the respective digital devices are responsive to a leading edge of the clock signal.

* * * * *